(12) United States Patent
Cohen et al.

(10) Patent No.: US 8,713,116 B2
(45) Date of Patent: Apr. 29, 2014

(54) SYSTEM AND METHOD FOR CONFIRMING DELIVERY OF AN ELECTRONIC MESSAGE

(76) Inventors: Shai Cohen, Binyamina (IL); Boaz Apt, Yahud (IL)

(*) Notice: Subject to any disclaimer, the term of this patent is extended or adjusted under 35 U.S.C. 154(b) by 81 days.

(21) Appl. No.: 13/464,561

(22) Filed: May 4, 2012

(65) Prior Publication Data

US 2012/0284347 A1  Nov. 8, 2012

Related U.S. Application Data

(60) Provisional application No. 61/482,632, filed on May 5, 2011.

(51) Int. Cl.
*G06F 15/16* (2006.01)

(52) U.S. Cl.
USPC .......................... 709/206; 709/219

(58) Field of Classification Search
USPC ................... 709/200–206, 217–227, 228
See application file for complete search history.

(56) References Cited

U.S. PATENT DOCUMENTS

| 6,922,255 B1* | 7/2005 | Tomida ................. 358/1.15 |
| 2007/0055931 A1* | 3/2007 | Zaima et al. ............... 715/526 |
| 2011/0314116 A1* | 12/2011 | Bayer et al. ............... 709/206 |

FOREIGN PATENT DOCUMENTS

WO   WO 02/065349   8/2002

* cited by examiner

*Primary Examiner* — Moustafa M Meky
(74) *Attorney, Agent, or Firm* — Young & Thompson

(57) ABSTRACT

A method for confirming delivery of an electronic message from a sender computer to a recipient over a computer network includes: converting by a server at least part of the content of the message to a dynamic image, and saving it on the server; generating a link to the dynamic image with a unique tracking key; generating a secondary electronic message transmitted to the recipient computer, the secondary electronic message including the link to the dynamic image and recipient details; transmitting the secondary electronic message to the recipient computer; updating the server to reflect that the dynamic image has been viewed by the recipient when the recipient opened the secondary electronic message and the link to the dynamic image to view the dynamic image; and informing the sender that the dynamic image has been viewed by the recipient, thereby confirming the delivery of the original electronic message.

31 Claims, 3 Drawing Sheets

SYSTEM AND METHOD FOR CONFIRMING DELIVERY OF AN ELECTRONIC MESSAGE

FIELD OF THE INVENTION

The present invention generally relates to a system and method for confirming delivery of an electronic message, and more specifically, to an image conversion based system and method for delivery of an electronic message.

BACKGROUND OF THE INVENTION

Electronic messaging has become pervasive. For instance, e-mail has become mission-critical for many businesses in enabling employees to communicate. Generally, people are relying on e-mail more than ever. As a result, the consequences of a recipient not receiving an e-mail can be significant. There are a number of reasons why an e-mail may not be received and/or read by the designated recipient. For example, the e-mail may have been lost in transit due to a network or host failure. Or, an e-mail may be filtered out by a spam filter, which filters out so-called junk e-mail, at the sending side or at the receiving side. Moreover, different e-mail providers use different spam filters, and the filters are always evolving. Thus, an e-mail that may have been successfully received in the past may not be received in the future if re-sent. Further, an e-mail may not be read simply because the recipient did not check his or her e-mail inbox.

PCT patent application no. WO 02/065349 (referred herein after as '349) discloses a trackable electronic document method and/or system seeks to provide that a recipient is not required to separately log into a web-page to view a document, such as an invoice, nor does the trackable electronic document method and/or system require the recipient to open an attachment. The trackable electronic document method and/or system also seeks to allow documents, such as invoices, to be presented in substantially or exactly the same format as the printed document would appear. Furthermore, the trackable electronic document method and/or system can generate a display receipt when the document, such as an invoice, is displayed in the body of an e-mail received by a recipient. The display receipt is automatically returned to the server.

Patent application '349 suffers from critical limitations while proving the conversion of an email document to an image on the sender's computer. This operation requires special conversion software which has to be installed onto the sender's computer.

Moreover, the system and the method disclosed in patent application '349 can not be regulated. In other words, the content of the image which had been converted on the sender's computer might be edited by said sender, or by anyone else before the image is sent to the server. This limitation creates reliability and privacy issues.

Yet more, such a conversion of an electronic message to an image usually requires computational time and resources from the sender's computer.

Therefore, there is a long felt need to develop a system which provides delivery confirmation for electronic messages in a flexible, a time-efficient, and a user-friendly manner which is compatible across different electronic messaging systems, and which maintains privacy of recipients and reliability regarding the contents of the electronic messages delivered by the system.

SUMMARY OF THE INVENTION

It is one object of the present invention to provide a computer-implemented method for confirming delivery of an electronic message over a computer network. The method comprises steps of:
a. Providing a sender computer, a server, and a recipient computer, the sender computer is operated by a sender and the recipient computer is operated by a recipient.
b. Composing an original electronic message by the sender in the sender computer. The original electronic message is designated to the recipient by means of recipient details.
c. Transmitting the original electronic message to the server according to a request of the sender.
d. Converting by the server at least part of the content of the original electronic message to a dynamic image, and saving the dynamic image in a specific location on the server.
e. Generating by the server at least one link to the dynamic image with a unique tracking key.
f. Generating a secondary electronic message adapted to be transmitted to the recipient computer. The secondary electronic message comprises the at least one link to the dynamic image and the recipient details.
g. Transmitting the secondary electronic message to the recipient computer, and opening the secondary electronic message by the recipient.
h. Updating the server that the dynamic image has been viewed by the recipient when the recipient had opened the secondary electronic message and the at least one link to the dynamic image to view the dynamic image.
i. Informing the sender that the dynamic image has been viewed by the recipient, and thereby confirming the delivery of the original electronic message.

It is within the scope of the present invention that the step of converting the electronic message to the dynamic image of the original electronic message is performed on the server via converting means installed on the same. The dynamic image can not be available to the recipient without the step of informing the sender that the dynamic image has been viewed by the recipient.

It is another object of the present invention to provide the computer-implemented method for confirming delivery of an electronic message as defined above, wherein the dynamic image is not viewable to the recipient without performing the step (i) of informing the sender that the dynamic image has been viewed by the recipient.

It is another object of the present invention to provide the computer-implemented method for confirming delivery of an electronic message as defined above, wherein the step (i) of informing the sender that the dynamic image has been viewed by the recipient is performed either prior to, simultaneously or after the step of viewing the dynamic image.

It is another object of the present invention to provide the computer-implemented method for confirming delivery of an electronic message as defined above, further comprises step of selecting the electronic message from a group consisting of: an e-mail, a short message service (SMS), a text message, a multimedia message service (MMS), an instant messaging (IM), or any combination thereof.

It is another object of the present invention to provide the computer-implemented method for confirming delivery of an electronic message as defined above, further comprises step of selecting the sender computer and the recipient computer from a group consisting of: a personal computer (PC), a mobile phone, a laptop, an electronic device with input and output means, or any combination thereof.

It is another object of the present invention to provide the computer-implemented method for confirming delivery of an electronic message as defined above, wherein the secondary electronic message comprises the dynamic image with preserved original links from the original electronic message.

It is another object of the present invention to provide the computer-implemented method for confirming delivery of an electronic message as defined above, wherein said original links are encoded links with a unique tracking key, and said method further comprising steps of updating said server and informing said sender that at least one encoded link has been viewed without viewing said dynamic image.

It is another object of the present invention to provide the computer-implemented method for confirming delivery of an electronic message as defined above, wherein the steps of generating a secondary electronic message and transmitting the secondary electronic message to the recipient computer are performed on the server.

It is another object of the present invention to provide the computer-implemented method for confirming delivery of an electronic message as defined above, wherein the steps of generating a secondary electronic message and transmitting the secondary electronic message to the recipient computer are performed on the sender computer.

It is another object of the present invention to provide the computer-implemented method for confirming delivery of an electronic message as defined above, wherein the step of updating the server that the dynamic image has been viewed by the recipient, wherein the server comprises a database adapted to store the status and of each original electronic message and each secondary electronic message.

It is another object of the present invention to provide the computer-implemented method for confirming delivery of an electronic message as defined above, further comprises a step of selecting the status from a group consisting of: the dynamic image viewed by the recipient, the dynamic image has not been viewed by the recipient, the time and the date stamp in which the dynamic image has been viewed by the recipient, said secondary electronic message has been fully viewed, said secondary electronic message has been partially viewed.

It is another object of the present invention to provide the computer-implemented method for confirming delivery of an electronic message as defined above, wherein the step of informing the sender that the dynamic image has been viewed by the recipient is performed by sending a confirmation electronic message to the sender.

It is another object of the present invention to provide the computer-implemented method for confirming delivery of an electronic message as defined above, wherein the step of informing the sender that the dynamic image has been viewed by the recipient is performed by allowing the sender to access the database on the server by means of a web-site.

It is another object of the present invention to provide the computer-implemented method for confirming delivery of an electronic message as defined above, further comprises step of presenting to the sender the time and the date stamp in which the dynamic image has been viewed by the recipient.

It is another object of the present invention to provide the computer-implemented method for confirming delivery of an electronic message as defined above, further comprises step of utilizing encryption and/or digital signature to the dynamic image and/or the secondary electronic message.

It is another object of the present invention to provide the computer-implemented method for confirming delivery of an electronic message as defined above, further comprises steps of activating and deactivating the method for confirming delivery of an electronic message.

It is another object of the present invention to provide the computer-implemented method for confirming delivery of an electronic message as defined above, wherein the method is adapted to confirm delivery of an electronic message to multiple recipients when the original electronic message comprises multiple recipient details of recipients, each link to the dynamic image viewed by each recipient of the multiple recipients has a different unique tracking key for confirming delivery of an electronic message independently.

It is another object of the present invention to provide the computer-implemented method for confirming delivery of an electronic message as defined above, further comprises step of inserting the at least one link to the dynamic image into the body of the secondary electronic message.

It is another object of the present invention to provide a computer readable media having computer readable code embodied thereon for programming at least one processor to perform a method for confirming delivery of an electronic message over a computer network, the method comprises steps of:

a. Providing a sender computer, a server, and a recipient computer, the sender computer is operated by a sender and the recipient computer is operated by a recipient.
b. Composing an original electronic message by the sender in the sender computer. The original electronic message is designated to the recipient by means of recipient details.
c. Transmitting the original electronic message to the server according to a request of the sender.
d. Converting at least part of the content of the original electronic message to a dynamic image of the original electronic message, and saving the dynamic image in a specific location on the server;
e. Generating by the server at least one link to the dynamic image with a unique tracking key.
f. Generating a secondary electronic message adapted to be transmitted to the recipient computer. The secondary electronic message comprises the at least one link to the dynamic image and the recipient details.
g. Transmitting the secondary electronic message to the recipient computer.
h. Updating the server that the dynamic image has been viewed by the recipient when the recipient had opened the secondary electronic message and the at least one link to the dynamic image to view the dynamic image.
i. Informing the sender that the dynamic image has been viewed by the recipient, and thereby confirming the delivery of the original electronic message.

It is within the scope of the present invention the step (d) of converting the electronic message to the dynamic image of the original electronic message is performed on the server via converting means installed on the same.

It is another object of the present invention to provide the computer readable media as defined above, wherein the dynamic image is not viewable to the recipient without performing the step (i) of informing the sender that the dynamic image has been viewed by the recipient.

It is another object of the present invention to provide the computer readable media as defined above, wherein the step (i) of informing the sender that the dynamic image has been viewed by the recipient is performed either prior to, simultaneously or after the step of viewing said dynamic image.

It is another object of the present invention to provide the computer readable media as defined above, further comprises step of selecting the electronic message from a group consisting of: an e-mail, a short message service (SMS), a text message, a multimedia message service (MMS), an instant messaging (IM), or any combination thereof.

It is another object of the present invention to provide the computer readable media as defined above, further comprises step of selecting the sender computer and the recipient computer from a group consisting of: a personal computer (PC), a mobile phone, a laptop, an electronic device with input and output means, or any combination thereof.

It is another object of the present invention to provide the computer readable media as defined above, wherein the secondary electronic message comprises said dynamic image with preserved original links from the original electronic message.

It is another object of the present invention to provide the computer readable media as defined above, wherein said original links are encoded links with a unique tracking key, and the method further comprising steps of updating the server and informing the sender that at least one encoded link has been viewed without viewing the dynamic image.

It is another object of the present invention to provide the computer readable media as defined above, wherein the steps of generating a secondary electronic message and transmitting the secondary electronic message to the recipient computer are performed on the server.

It is another object of the present invention to provide the computer readable media as defined above, wherein the steps of generating a secondary electronic message and transmitting the secondary electronic message to the recipient computer are performed on the sender computer.

It is another object of the present invention to provide the computer readable media as defined above, wherein the step of updating the server that the dynamic image has been viewed by the recipient, wherein the server comprises a database adapted to store the status and of each original electronic message and each secondary electronic message.

It is another object of the present invention to provide the computer readable media as defined above, further comprises a step of selecting the status from a group consisting of: the dynamic image viewed by the recipient, the dynamic image has not been viewed by the recipient, the time and the date stamp in which the dynamic image has been viewed by the recipient, the secondary electronic message has been fully viewed, the secondary electronic message has been partially viewed.

It is another object of the present invention to provide the computer readable media as defined above, wherein the step of informing the sender that the dynamic image has been viewed by the recipient is performed by sending a confirmation message to the sender.

It is another object of the present invention to provide the computer readable media as defined above, wherein the step of informing the sender that the dynamic image has been viewed by the recipient is performed by allowing the sender to access the database on the server by means of a web-site.

It is another object of the present invention to provide the computer readable media as defined above, further comprises step of presenting to the sender the time and the date stamp in which the dynamic image has been viewed by the recipient.

It is another object of the present invention to provide the computer readable media as defined above, further comprises step of utilizing encryption and/or digital signature to the dynamic image and/or the secondary electronic message.

It is another object of the present invention to provide the computer readable media as defined above, further comprises steps of activating and deactivating the method for confirming delivery of an electronic message.

It is another object of the present invention to provide the computer readable media as defined above, wherein the method is adapted to confirm delivery of an electronic message to multiple recipients when the original electronic message comprises multiple details of recipients, each link to the dynamic image viewed by each recipient of the multiple recipients has a different unique tracking key for confirming delivery of an electronic message independently.

It is another object of the present invention to provide the computer readable media as defined above, further comprises step of inserting the at least one link to the dynamic image into the body of the secondary electronic message.

It is another object of the present invention to provide an electronic messaging system for confirming delivery of an electronic message over a computer network. The system comprises:

a. A sender computer operated by a sender comprises a computer readable media having computer readable code embodied thereon for programming at least one processor configured to: (i) compose an original electronic message; (ii) transmit the original electronic message to a server according to a request of the sender.

b. A server which comprises a computer readable media having a computer readable code embodied thereon for programming at least one processor configured to: (i) convert at least part of the content of the original electronic message to a dynamic image; (ii) save the dynamic image in a specific location on the server; (iii) generate at least one link to the dynamic image with a unique tracking key; (iv) generate a secondary electronic message adapted to be transmitted to the recipient computer; the secondary electronic message comprises the at least one link to the dynamic image and the recipient details; (v) transmit the secondary electronic message to the recipient computer; and, (vi) inform the sender that the dynamic image has been viewed by the recipient, such that the delivery of the original electronic message is confirmed.

c. A recipient computer operated by a recipient comprises a computer readable media having computer readable code embodied thereon for programming at least one processor configured to: (i) open the secondary electronic message; (ii) open the at least one link to the dynamic image to view the dynamic image by the recipient, and thereby (iii) update the server that the dynamic image has been viewed by the recipient;

It is within the scope of the present invention that the server is adapted to convert at least part of the content of said original electronic message to a dynamic image via converting means installed on the same installed on the same.

It is another object of the present invention to provide the electronic messaging system as defined above, wherein said dynamic image is not viewable to said recipient without said sender is being informed that said dynamic image has been viewed by said recipient.

It is another object of the present invention to provide the electronic messaging system as defined above, wherein said sender is being informed that said dynamic image has been viewed by said recipient either prior to, simultaneously or after said dynamic image has been viewed by said recipient.

It is another object of the present invention to provide the electronic messaging system as defined above, wherein the electronic message is selected from a group consisting of: an e-mail, a short message service (SMS), a text message, a multimedia message service (MMS), an instant messaging (IM), or any combination thereof.

It is another object of the present invention to provide the electronic messaging system as defined above, wherein the sender computer and the recipient computer is selected from a group consisting of: a personal computer (PC), a mobile phone, a laptop, an electronic device with input and output means, or any combination thereof.

It is another object of the present invention to provide the electronic messaging system as defined above, wherein the secondary electronic message comprises the dynamic image with preserved original links from the original electronic message.

It is another object of the present invention to provide the electronic messaging system as defined above, wherein said original links are encoded links with a unique tracking key, and said recipient computer is adapted to update said server and inform said sender that at least one encoded link has been viewed without viewing said dynamic image.

It is another object of the present invention to provide the electronic messaging system as defined above, wherein the server comprises a database adapted to store the status and of each original electronic message and each secondary electronic message.

It is another object of the present invention to provide the electronic messaging system as defined above, wherein the status is selected from a group consisting of: the dynamic image viewed by the recipient, the dynamic image has not been viewed by the recipient, the time and the date stamp in which the dynamic image has been viewed by the recipient, the secondary electronic message has been fully viewed, the secondary electronic message has been partially viewed.

It is another object of the present invention to provide the electronic messaging system as defined above, wherein the server is configured to inform the sender that the dynamic image has been viewed by the recipient by sending a confirmation message to the sender.

It is another object of the present invention to provide the electronic messaging system as defined above, wherein the server is configured to inform the sender that the dynamic image has been viewed by the recipient by allowing the sender to access the database on the server by means of a web-site.

It is another object of the present invention to provide the electronic messaging system as defined above, wherein the server is further configured to present to the sender the time and the date stamp in which the dynamic image has been viewed by the recipient.

It is another object of the present invention to provide the electronic messaging system as defined above, wherein the server is further configured to utilize encryption and/or digital signature to the dynamic image and/or the secondary electronic message.

It is another object of the present invention to provide the electronic messaging system as defined above, wherein the system is further adapted to be activated and deactivated the confirmation of the delivery of an electronic message.

It is another object of the present invention to provide the electronic messaging system as defined above, wherein the system is adapted to confirm delivery of an electronic message to multiple recipients when the original electronic message comprises multiple details of recipients, each link to the dynamic image viewed by each recipient of the multiple recipients has a different unique tracking key for confirming delivery of an electronic message independently.

It is another object of the present invention to provide the electronic messaging system as defined above, wherein the at least one link to the dynamic image is insertable into the body of the secondary electronic message.

It is another object of the present invention to provide an electronic messaging system for confirming delivery of an electronic message over a computer network. The system comprises:

a. A sender computer operated by a sender comprises a computer readable media having computer readable code embodied thereon for programming at least one processor configured to: (i) compose an original electronic message; (ii) transmit the original electronic message to the server according to a request of the sender; (iii) generate a secondary electronic message adapted to be transmitted to the recipient computer; the secondary electronic message comprises a link to the dynamic image and a recipient details; and, (iv) transmit the secondary electronic message to the recipient computer.

b. A server comprises a computer readable media having computer readable code embodied thereon for programming at least one processor configured to: (i) convert at least part of the content of the original electronic message to a dynamic image; (ii) save the dynamic image in a specific location on the server; (iii) generate at least one link to the dynamic image with a unique tracking key; (iv) transmit the at least one link to the dynamic image to the sender computer; and, (v) inform the sender that the dynamic image has been viewed by the recipient, such that the delivery of the original electronic message is confirmed.

c. A recipient computer operated by a recipient comprises a computer readable media having computer readable code embodied thereon for programming at least one processor configured to: (i) open the secondary electronic message; (ii) open the at least one link to the dynamic image to view the dynamic image by the recipient, and thereby (iii) update the server that the dynamic image has been viewed by the recipient.

It is within the scope of the present invention that the server is adapted to convert at least part of the content of said original electronic message to a dynamic image via converting means installed on the same installed on the same.

It is another object of the present invention to provide the electronic messaging system as defined above, wherein said dynamic image is not viewable to said recipient without said sender is being informed that said dynamic image has been viewed by said recipient.

It is another object of the present invention to provide the electronic messaging system as defined above, wherein said sender is being informed that said dynamic image has been viewed by said recipient either prior to, simultaneously or after said dynamic image has been viewed by said recipient.

It is another object of the present invention to provide the electronic messaging system as defined above, wherein the electronic message is selected from a group consisting of: an e-mail, a short message service (SMS), a text message, a multimedia message service (MMS), an instant messaging (IM), or any combination thereof.

It is another object of the present invention to provide the electronic messaging system as defined above, wherein the sender computer and the recipient computer is selected from a group consisting of: a personal computer (PC), a mobile phone, a laptop, an electronic device with input and output means, or any combination thereof.

It is another object of the present invention to provide the electronic messaging system as defined above, wherein the secondary electronic message comprises the dynamic image with preserved original links from the original electronic message.

It is another object of the present invention to provide the electronic messaging system as defined above, wherein said original links are encoded links with a unique tracking key, and said recipient computer adapted to update said server and to inform said sender that at least one encoded link has been viewed without viewing said dynamic image.

It is another object of the present invention to provide the electronic messaging system as defined above, wherein the server comprises a database adapted to store the status and of each original electronic message and each secondary electronic message.

It is another object of the present invention to provide the electronic messaging system as defined above, wherein the status is selected from a group consisting of: the dynamic image viewed by the recipient, the dynamic image has not been viewed by the recipient, the time and the date stamp in which the dynamic image has been viewed by the recipient, the secondary electronic message has been fully viewed, the secondary electronic message has been partially viewed.

It is another object of the present invention to provide the electronic messaging system as defined above, wherein the server is configured to inform the sender that the dynamic image has been viewed by the recipient by sending a confirmation message to the sender.

It is another object of the present invention to provide the electronic messaging system as defined above, wherein the server is configured to inform the sender that the dynamic image has been viewed by the recipient by allowing the sender to access the database on the server by means of a web-site.

It is another object of the present invention to provide the electronic messaging system as defined above, wherein the server is further configured to present to the sender the time and the date stamp in which the dynamic image has been viewed by the recipient.

It is another object of the present invention to provide the electronic messaging system as defined above, wherein the server is further configured to utilize encryption and/or digital signature to the dynamic image and/or the secondary electronic message.

It is another object of the present invention to provide the electronic messaging system as defined above, wherein the system is further adapted to be activated and deactivated the confirmation of the delivery of an electronic message.

It is another object of the present invention to provide the electronic messaging system as defined above, wherein the system is adapted to confirm delivery of an electronic message to multiple recipients when the original electronic message comprises multiple details of recipients, each link to the dynamic image viewed by each recipient of the multiple recipients has a different unique tracking key for confirming delivery of an electronic message independently.

It is another object of the present invention to provide the electronic messaging system as defined above, wherein the at least one link to the dynamic image is insertable into the body of the secondary e-mail.

BRIEF DESCRIPTION OF THE FIGURES

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

Figure 1:
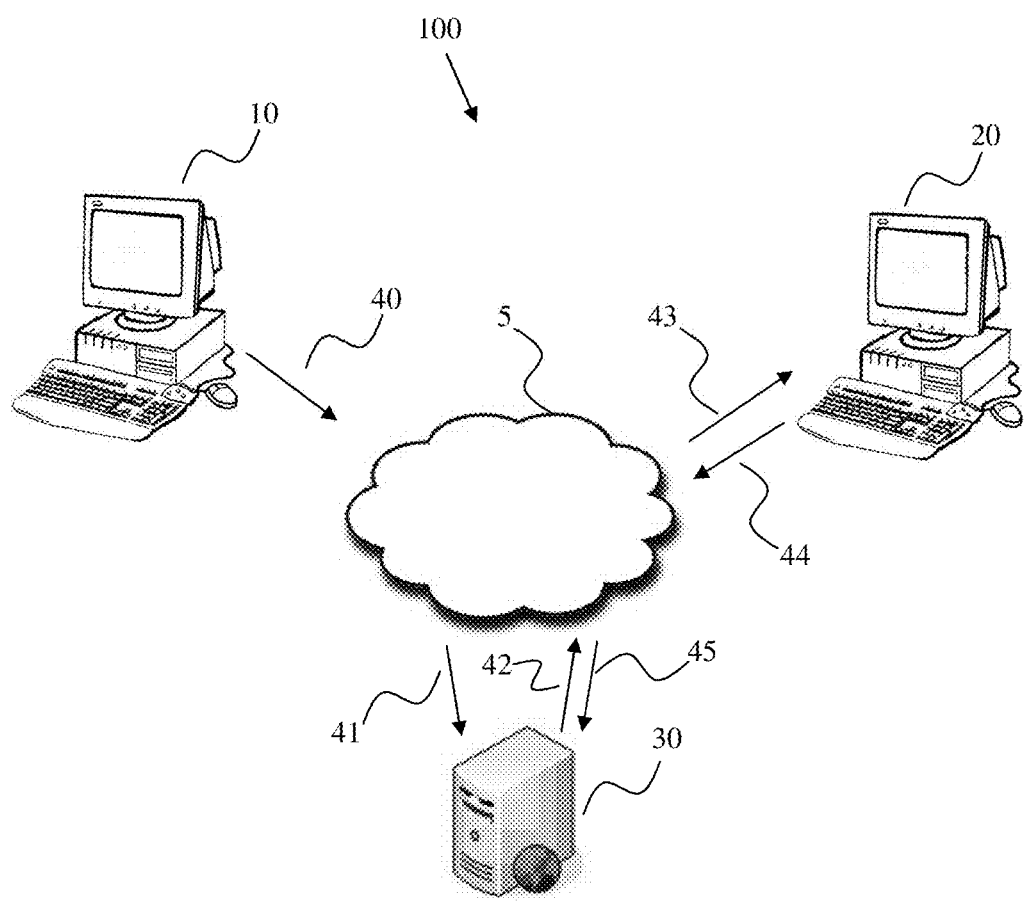
FIG. 1 is a schematic illustration of the system of the present invention in its specific embodiment.

The drawings together with the description make apparent to those skilled in the art how the invention may be embodied in practice.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term 'electronic message' refers hereinafter to message which is representable and/or deliverable via electronic means. Moreover, this term refers hereinafter to an e-mail message, a short message service (SMS), a text message, a multimedia message service (MMS), an instant messaging (IM), any textual electronic message convertible to a graphic representation of said electronic message.

The term 'dynamic image' refers hereinafter to any known format of an electronic image which has been converted from the original representation of the original electronic message.

The term 'converting means' refers hereinafter to image conversion software which is capable of converting the content of an electronic message to a dynamic image.

The terms 'sender computer' and/or 'recipient computer' refer hereinafter to a personal computer (PC), a mobile phone, a laptop, or any electronic device with input and/or output means.

The term 'link' refers hereinafter to a hyperlink, or any reference to another location/document or to a specific part of the another location/document.

The present invention discloses a new method and/or system for confirming delivery of an electronic message over a computer network.

The method of the present invention comprises the following steps:

a. Providing a sender computer, a server, and a recipient computer, the sender computer is operated by a sender and the recipient computer is operated by a recipient.

b. Composing an original electronic message by the sender in the sender computer. The original electronic message is designated to the recipient by means of recipient details.

c. Transmitting the original electronic message to the server according to a request of the sender.

d. Converting at least part of the content of the original electronic message to a dynamic image of the original electronic message, and saving the dynamic image in a specific location on the server;

e. Generating by the server at least one link to the dynamic image with a unique tracking key.

f. Generating a secondary electronic message adapted to be transmitted to the recipient computer. The secondary electronic message comprises the at least one link to the dynamic image and the recipient details.
g. Transmitting the secondary electronic message to the recipient computer.
h. Updating the server that the dynamic image has been viewed by the recipient when the recipient had opened the secondary electronic message and the at least one link to the dynamic image to view the dynamic image.
i. Informing the sender that the dynamic image has been viewed by the recipient, and thereby confirming the delivery of the original electronic message.

It should be mentioned that the step (d) of converting the electronic message to the dynamic image of the original electronic message is performed on the server via converting means installed on the server. The dynamic image can not be available to the recipient without the step of informing the sender that the dynamic image has been viewed by the recipient.

The system of the present invention has the following advantages over PCT patent application '349:

In case of a webmail (Web-based e-mail) used by the sender, the system does not require installation of special software on the sender computer or the recipient computer.

The system can be used as a web service system for developers and users.

The system is reliable since the contents delivered through it can be regulated by a $3^{rd}$ independent party (e.g., on the server's side). For example, the sender and the recipient can be sure that the dynamic picture was not edited while being delivered from the sender to the recipient.

Most of the operations which are performed by the system are carried out on the server. Therefore, the system does not depend on a computation power of a stand alone PC, and is much more reliable machine than a stand alone PC, by means of: computation power, speed, volume, backups, etc.

The sender of the electronic document that uses that system fills that he uses a standard electronic messaging service, without additional steps performed on his computer (e.g., image conversion).

The system is time-efficient for both the sender and the recipient.

Reference is now made to FIG. 1 which illustrates a specific embodiment of the present invention. In this figure illustrated system 100 for confirming delivery of an electronic message over a computer network 5. According to this figure, a sender computer 10 operated by a sender, is in communication with server 30 via network 5, so that an original electronic message may be transmitted via network 5 and server 30 to recipient computer 20 which is operated by a recipient. According to a specific embodiment of the present invention, network 5 is the internet network.

In the general principle of the present invention, each original electronic message transmitted from sender computer 10 to server 30 by processes 40 and 41, is tracked via a unique tracking key which is automatically attached to the original electronic message by server 30, and thereby identified. In the following steps 42 and 43 of the present invention, the content of the original message is transmitted to recipient computer 20. At steps 44 and 45, a confirmation that the recipient has been exposed to the content of the original message is delivered to server 30 and/or sender computer 10. It should be noted that the networks which are utilized to communicate between sender computer 10 and server 30, and recipient computer 20 and server 30 might be different networks. In spite of that, according to the preferred embodiment of the present invention, said networks are the same network which is the internet.

It is within the core of the present invention that the recipient is informed that a new electronic message has arrived from the sender. In order to view the content of this new electronic message, there is a requirement of the system to inform the sender that the recipient was exposed to the content of this electronic message. In other words, the recipient can not be exposed to the content of the original electronic message without the sender's knowledge about this act. If the sender does not receive any confirmation regarding the delivery of the electronic message, this means that the content of the original message was not opened, read or received by the recipient.

The main process which is performed by the system of the present invention is a process of converting the original electronic message to a secondary electronic message, which comprises the content of the original electronic message by means of a link to the dynamic image of said content. This process is performed on server 30. According to this process, the content of the original electronic message which is represented by any textual or graphical means is converted to a dynamic image on server 30. This means that the content of the original message and the content in the dynamic image format look substantially the same when perceived by a user. Moreover, according to a specific embodiment in which the original message comprises at least one link, the at least one link is preserved in the secondary electronic message (described below). According to this process, the dynamic image is saved on server 30, and a link to the dynamic image with predetermined unique tracking key is designated for the dynamic image. The secondary electronic message which comprises the details of the sender (e.g., e-mail address, name, phone number, etc.), the details of the recipient (e.g., e-mail address, name, phone number, etc.), and a link to the dynamic image is transmitted to recipient computer 20. When the recipient opens secondary electronic message, only after opening the at least one link to the dynamic image, a confirmation that the recipient has received the electronic message is delivered to the server and/or to the sender.

Figure 2:
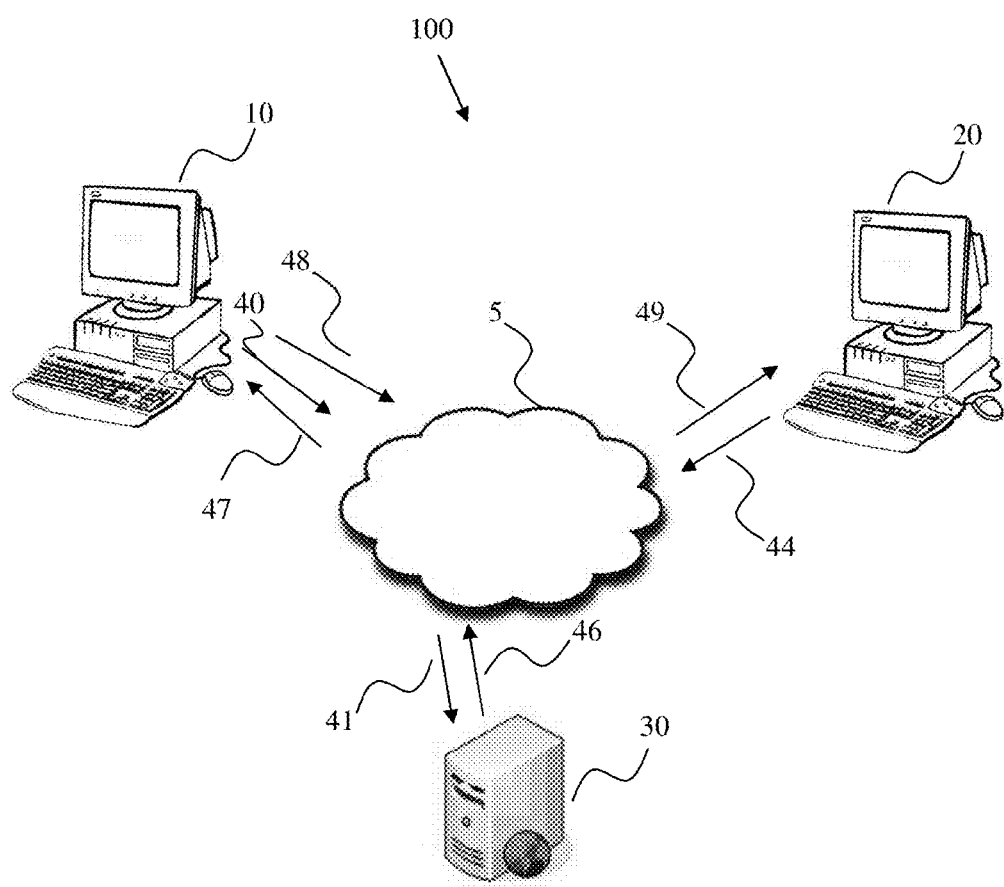
FIG. 2 is a schematic illustration of the system of the present invention in another specific embodiment.

Reference is now made to FIG. 2 which illustrates another embodiment of the present invention. The difference between this embodiment of the present invention, and the embodiment of FIG. 1 is in the way the secondary electronic message is delivered to recipient computer 20. According to this embodiment, after the generation of the dynamic image and the specific unique tracking key of the dynamic image, the at least one link to said dynamic image is delivered to sender computer 10 via a third electronic message, in processes 46 and 47. In the following steps 48 and 49, the secondary electronic message which is automatically or manually composed on sender computer 10, is transmitted to recipient computer 20 through network 5. The secondary electronic message delivered from sender computer 10 comprises the details of the sender (e.g., e-mail address, name, phone number, etc.), the details of the recipient (e.g., e-mail address, name, phone number, etc.), and a link to the dynamic image is transmitted to recipient computer 20. When the recipient opens the secondary electronic message, only after opening the at least one link to the dynamic image, a confirmation that the recipient has received the electronic message is delivered to server 30 and/or to the sender computer 20.

According to some embodiments of the present invention, the confirmation regarding the delivery of the electronic message to the recipient can be provided by: (i) an electronic message transmitted by server 30 to sender computer 10 regarding the confirmation; and (ii) the sender can view the status of the original electronic message by entering to a web-site connected to server 30.

According to a specific embodiment in which the sender is using an electronic message software (e.g., Outlook, etc.), in order to use the system of the present invention, the sender will have to install an add-on to this software. This add-on will allow the sender to send his electronic message through server 5, so that the electronic message will be delivered by one of the methods of the present invention.

Figure 3:
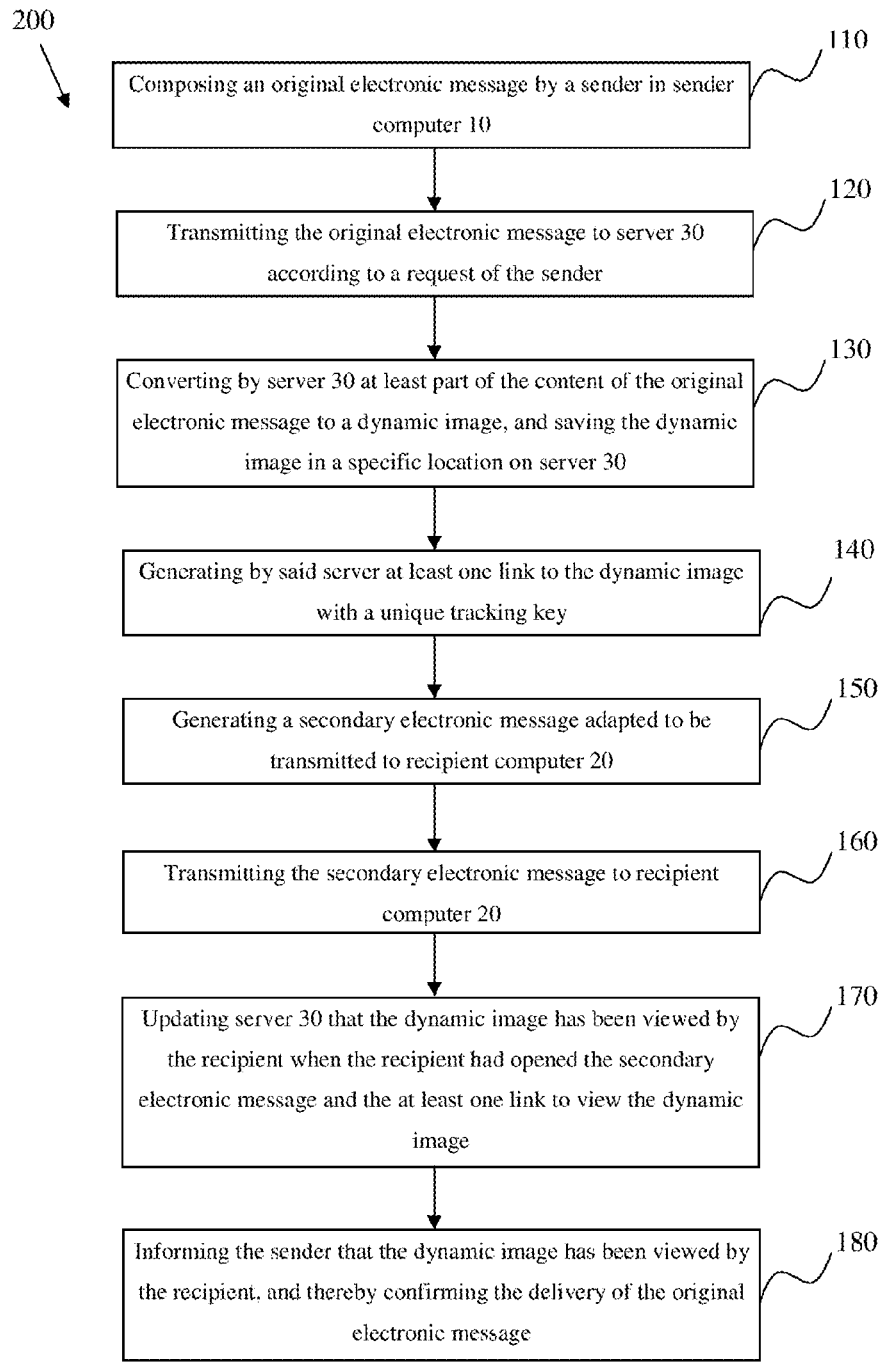
FIG. 3 is a schematic illustration of the method of the present invention.

Reference is now made to FIG. 3 which schematically illustrates a specific embodiment of the computer-implemented method 200 of the present invention for confirming delivery of an electronic message over a computer network. Method 200 uses sender computer 10, server 30, and recipient computer 20. Sender computer 10 is operated by a sender and recipient computer 20 is operated by a recipient.

At step 110 of method 200, an original electronic message is composed by the sender operating sender computer 10. The original electronic message is designated to the recipient by means of a recipient's details. The recipient details may be: an email address, a phone number, a user name, a name, a nick name, an address, etc.

At step 120 of method 200, the original electronic message is transmitted to server 30 according to a request of the sender (e.g., an email is sent by the sender to the recipient through the server).

At step 130 of method 200, at least part of the content of the original electronic message is converted on server 30 to a dynamic image, and the dynamic image is saved in a specific location on server 30. The conversion of the content of the original electronic message to the dynamic image is performed via known in the art techniques. According to a specific embodiment of the present invention, the dynamic image disclosed in the present invention is a standard image with sensitive areas which comprise links (e.g., image map in HTML) as they appear in the original electronic message. In other words, the secondary electronic message may comprise a dynamic image which is a computerized image with preserved original links from said original electronic message. The conversion algorithm of the present invention (which converts to the dynamic image) is provided with an ability to locate the coordinates of each link in the original electronic message, and to preserve and provide said coordinated by an additional file capable of the storing and presenting image maps to the dynamic image (e.g., HTML file). This additional file may be the secondary electronic message. This can be done, for example, by using the "image map" function of the HTML language. For clarification, it should be noted that the dynamic image might comprise two forms: (i) when the original message does not comprise links, the dynamic image will be an image without link sensitive areas (without links and without image map stored in an additional file); and, (ii) when the original message comprises links, the dynamic image will be presented by an additional file (e.g., HTML file), which according to a specific embodiment is the secondary electronic message, which stores the coordinates of the links associated with the dynamic image (e.g., via an image map).\

According to some embodiments, the original links of the original electronic message are encoded links with a unique tracking key. In this case, the recipient computer will be able to update the server and to inform the sender that at least one encoded link has been viewed without viewing the dynamic image. For example, if the recipient tries to open the links which were the original links of the original message, the sender will know that these links have been viewed without viewing the content of the original message. This option may be called: "partial viewing" or "partial receiving" of an electronic message. The sender may also know which link of the original links has been viewed.

At step 140 of method 200, a link to the dynamic image with a unique tracking key (e.g., a tracking number) is generated. According to a specific embodiment, when this link to the dynamic image is accessed at least one time, a confirmation regarding the delivery of the original electronic message is registered in server 30. It should be noted that each original electronic message has its own unique tracking key.

At step 150 of method 200, a secondary electronic message is generated. The secondary electronic message is adapted to be transmitted to recipient computer 20 according to recipient's details. The secondary electronic message comprises said at least one link to the dynamic image which is adapted to be opened by said recipient in order to view the content of the electronic message sent by the sender. According to some embodiments, the at least one link to the dynamic image is inserted into the body of the secondary electronic message. According to a specific embodiment of the present invention, step 150 is performed on server 30. In this case, the secondary electronic message is delivered from server 30 the recipient computer 20. According to another embodiment, step 150 is performed on sender computer 10 following an additional step in which a third electronic message with the at least one link to the dynamic image and the details of the recipient are transmitted to sender computer 10. According to another embodiment, step 150 is performed on sender computer 10, but in this case the details of the recipient are not exposed to the server. According to this embodiment, the original message without the details of the recipient are delivered to the server, and a link to the dynamic image is delivered back to the sender computer. Only after these steps, the recipient details are added to this link, and secondary message is delivered to the recipient computer. According to this embodiment, there is no registration of the recipient's details on the server.

At step 160 of method 200, the secondary electronic message is transmitted to recipient computer 20 and following that the secondary electronic message is opened by the recipient. When secondary electronic message is presented to the recipient, said recipient is exposed to the details of the sender (e.g., the sender's e-mail address). If the recipient decided to view the content of the original electronic message, he has to open the at least one link to the dynamic image. Following the opening of the link to the dynamic image, the dynamic image is downloaded to recipient computer 20, and the content of the original electronic message is presented to the recipient. According to some embodiments, the dynamic image and/or the secondary electronic message are encrypted and a digital signature might also be utilized. According to some embodiments, when the dynamic image comprises links which appeared in the original electronic message, following the opening of the link to the dynamic image by the recipient, an additional file (e.g., HTML file) which comprises the coordinates of the links (e.g., image map) will be downloaded to the recipient computer. According to other embodiment, this additional file may be the secondary electronic message.

At step 170 of method 200, the at least one link to the dynamic image is opened by the recipient in order to view the content of the original electronic message, and upon that the server is updated that the dynamic image has been viewed by the recipient. According to some embodiments of the present invention, server 30 comprises a database which is adapted to store the status and/or additional data of each original electronic message and each secondary electronic message. For example, this status may be updated to "received" when the dynamic image is viewed by the recipient. Other examples to the status may be: "the dynamic image was viewed by said recipient", "the dynamic image was not viewed by said recipient", "the secondary electronic message has been fully viewed", "the secondary electronic message has been partially viewed". Examples of the additional data are: the time and the date stamp in which the dynamic image has been viewed by the recipient; IP address of the recipient computer 20; the time in which the second electronic message was transferred to recipient computer 20. In other words, in step 170 of method 200 server 30 is updated that the dynamic image has been viewed by recipient when the recipient had opened the secondary electronic message and the at least one link to the dynamic image to view the dynamic image.

According to some embodiments of the present invention, the dynamic image has a format of a jpeg or a gif image file which is automatically downloaded to recipient computer 20 when the at least one link of said dynamic image is opened.

At step 180 of method 200, the sender is informed that the dynamic image has been viewed by the recipient, and thereby the delivery of the original electronic message is confirmed. It should be mentioned that the dynamic image can not be available to the recipient without step 180. According to some embodiments, step 180 might be performed by a confirmation electronic message sent to the sender. According to other embodiments, step 180 might be performed by web-site to which the sender may enter in order to receive to needed information regarding the status of the original electronic message. According to some embodiments, the sender may also receive information regarding the time and the date stamp in which the dynamic image has been viewed by the recipient.

One of the advantages of the present invention is that in some embodiments of the invention, the sender is not required to perform special steps (e.g., installing an image conversion software on his computer) in order to use the system for confirming the delivery of electronic message sent from his computer. These special steps are prevented due to the fact that the main operations of the system and the method of the present invention are performed on the server, and not on the sender's computer or the recipient's computer. For example, the converting means is installed on the server.

According to some embodiments of the present invention, the electronic message is selected from a group consisting of: an e-mail, a short message service (SMS), a text message, a multimedia message service (MMS), an instant messaging (IM), or any combination thereof. According to the preferred embodiment of the present invention, the electronic message is an e-mail.

According to some embodiments of the present invention, the sender computer and/or the recipient computers are from a group consisting of: a personal computer (PC), a mobile phone, a laptop, any electronic device with input and/or output means, or any combination thereof.

According to some embodiments, the system of the present invention might be activated and deactivated by sender 10. In the deactivated state, the system of the present invention is used as a standard system for delivery of electronic messages, without the feature of delivery confirmation.

According to some embodiments, the system of the present invention might also provide delivery confirmation when the original electronic message is delivered to a plurality of recipients. In this case, each recipient has its own details according to which the original message is delivered (e.g., e-mail address). The original electronic message is converted to a dynamic image which is stored in a plurality of locations; each location has its own link to the dynamic image and a unique tracking key. Each link to the dynamic image is delivered to a recipient via a second electronic message, and the delivery of each second electronic message is confirmed when the each recipient opens the at least one link to the dynamic image he has received. is adapted to confirm delivery of an electronic message to multiple recipients when said original electronic message comprises multiple recipient details of recipients, each link to the dynamic image viewed by each recipient of said multiple recipients has a different unique tracking key for confirming delivery of an electronic message independently.

According to some embodiments, the electronic message transmitted and/or received by the system of the present invention using simple mail transfer protocol (SMTP) and/or hyper-text transfer protocol (HTTP).

It should be noted that the terms 'received by the recipient', 'delivered to the recipient', 'viewed by the recipient', 'opened by the recipient' describe the same situation in which the recipient has been exposed to the content of the original electronic message.

According to some embodiments, the sender is capable of choosing which part of the original electronic message will be converted to a dynamic image. The rest of the original electronic message will be delivered as is, without the process of delivery confirmation.

It should be noted that the computer network as referenced in this specification should be taken to include all forms of connected or communicating computers or terminals having at least two terminals connected or communicating as hereinbefore described. That is, the term computer network should be taken to include any type of terminal as hereinbefore defined, computer, computerized device, peripheral computer equipment, computerized accessory, mobile or cellular phone, digital electronic device or other similar type of computerized electronic device or part thereof which is rendered such that it is capable of communicating with at least one of any of the aforementioned entities. Said communication of information or data can occur over any data communications network, computer network, wireless network, internetwork, intranetwork, local area network (LAN), wide area network (WAN), the Internet and developments thereof, transient or temporary network, combinations of the above or any other type of network providing for computerized, electronic or digital devices.

Furthermore, references to the terms: transmitting, receiving, and the like, and permutations thereof, as applied to the term computer network and/or components thereof should be taken to pertain to the transfer of information or data. Such transfers of information or data can be facilitated for by any form of entity/entities for facilitating such, including, but not limited to, metallic wires or cables, semi-conducting wires or cables, optical fibres and optical devices, wireless means, electromagnetic waves and the like and modulations thereof, acoustic waves and the like and modulations thereof, control of electric and/or magnetic fields, and/or the transportation of all forms of memory devices.

The invention claimed is:
1. A computer-implemented method for confirming delivery of an electronic message over a computer network, said method comprising steps of:
   a. providing a sender computer, a server, and a recipient computer, said sender computer is operated by a sender and said recipient computer is operated by a recipient;

b. composing an original electronic message by said sender in said sender computer, said original electronic message designated to said recipient by means of recipient details;
c. transmitting said original electronic message to said server according to a request of said sender;
d. converting by said server at least part of the content of said original electronic message to a dynamic image, and saving said dynamic image in a specific location on said server;
e. generating by said server at least one link to said dynamic image with a unique tracking key;
f. generating a secondary electronic message adapted to be transmitted to said recipient computer; said secondary electronic message comprising said at least one link to said dynamic image and said recipient details;
g. transmitting said secondary electronic message to said recipient computer;
h. updating said server that said dynamic image has been viewed by said recipient when said recipient had opened said secondary electronic message and said at least one link to said dynamic image to view said dynamic image;
i. informing said sender that said dynamic image has been viewed by said recipient, and thereby confirming the delivery of said original electronic message;

wherein said step (d) of converting said electronic message to said dynamic image of said original electronic message is performed on said server via converting means installed on the same, further wherein computer readable code for viewing said dynamic image resides on said server and said link is sent to said recipient, such that only when said recipient actively operates said computer readable code, said dynamic image is viewed by said recipient computer.

2. The method of claim 1, wherein said dynamic image is not viewable to said recipient without performing said step (i) of informing said sender that said dynamic image has been viewed by said recipient; further wherein said step (i) of informing said sender that said dynamic image has been viewed by said recipient is performed either prior to, simultaneously or after said step of viewing said dynamic image.

3. The method of claim 1, further comprising at least one step selected from a group consisting of (a) selecting said electronic message from a group consisting of: an e-mail, a short message service (SMS), a text message, a multimedia message service (MMS), an instant messaging (IM), or any combination thereof; (b) selecting said sender computer and said recipient computer from a group consisting of: a personal computer (PC), a mobile phone, a laptop, an electronic device with input and output means, and any combination thereof.

4. The method of claim 1, wherein at least one of the following is being held true (a) said secondary electronic message comprises said dynamic image with preserved original links from said original electronic message; (b) said original links are encoded links with a unique tracking key, and said method further comprising steps of updating said server and informing said sender that at least one encoded link has been viewed without viewing said dynamic image; (c) said steps of generating a secondary electronic message and transmitting said secondary electronic message to said recipient computer are performed on said server; (d) said steps of generating a secondary electronic message and transmitting said secondary electronic message to said recipient computer are performed on said sender computer; (e) said step of updating said server that said dynamic image has been viewed by said recipient, wherein said server comprises a database adapted to store the status and of each original electronic message and each secondary electronic message; (f) said step of informing said sender that said dynamic image has been viewed by said recipient is performed by sending a confirmation electronic message to said sender; (g) presenting to said sender the time and the date stamp in which said dynamic image has been viewed by said recipient; (h) utilizing encryption and/or digital signature to said dynamic image and/or said secondary electronic message; and any combination thereof.

5. The method of claim 1, further comprising at least one step selected from a group consisting of (a) selecting said status from a group consisting of: said dynamic image viewed by said recipient, said dynamic image has not been viewed by said recipient, the time and the date stamp in which said dynamic image has been viewed by said recipient, said secondary electronic message has been fully viewed, said secondary electronic message has been partially viewed; (b) activating and deactivating said method for confirming delivery of an electronic message; (c) inserting said at least one link to said dynamic image into the body of said secondary electronic message.

6. The method of claim 5, wherein said step of informing said sender that said dynamic image has been viewed by said recipient is performed by allowing said sender to access said database on said server by means of a web-site.

7. The method of claim 1 or claim 5, wherein said step of informing said sender that said dynamic image has been viewed by said recipient is performed by allowing said sender to access said database on said server by means of a web-site.

8. The method of claim 1, wherein said method is adapted to confirm delivery of an electronic message to multiple recipients when said original electronic message comprises multiple recipient details of recipients, each link to said dynamic image viewed by each recipient of said multiple recipients has a different unique tracking key for confirming delivery of an electronic message independently.

9. The method of claim 1, wherein said original electronic message can be sent to multiple recipients.

10. The method of claim 1, wherein said dynamic message can comprise sensitive areas which comprise links.

11. A computer readable memory having computer readable code embodied thereon for programming at least one processor to perform a method for confirming delivery of an electronic message over a computer network, said method comprising steps of:
a. providing a sender computer, a server, and a recipient computer, said sender computer is operated by a sender and said recipient computer is operated by a recipient;
b. composing an original electronic message by said sender in said sender computer, said original electronic message designated to said recipient by means of recipient details;
c. transmitting said original electronic message to said server according to a request of said sender;
d. converting by said server at least part of the content of said original electronic message to a dynamic image of said original electronic message, and saving said dynamic image in a specific location on said server;
e. generating by said server at least one link to said dynamic image with a unique tracking key;
f. generating a secondary electronic message adapted to be transmitted to said recipient computer; said secondary electronic message comprising said at least one link to said dynamic image and said recipient details;
g. transmitting said secondary electronic message to said recipient computer;
h. updating said server that said dynamic image has been viewed by said recipient when said recipient had opened said secondary electronic message and said at least one link to said dynamic image to view said dynamic image; and, i. informing said sender that said dynamic image has been viewed by said recipient, and thereby confirming the delivery of said original electronic message;

wherein said step (d) of converting said electronic message to said dynamic image of said original electronic message is performed on said server via converting means installed on the same, further wherein computer readable code for viewing said dynamic image resides on said server and said link is sent to said recipient, such that only when said recipient actively operates said computer readable code, said dynamic image is viewed by said recipient computer.

12. The computer readable memory of claim 11, further comprising at least one step selected from a group consisting of (a) selecting said electronic message from a group consisting of: an e-mail, a short message service (SMS), a text message, a multimedia message service (MMS), an instant messaging (IM), or any combination thereof; (b) selecting said sender computer and said recipient computer from a group consisting of: a personal computer (PC), a mobile phone, a laptop, an electronic device with input and output means, or any combination thereof; (c) selecting said status from a group consisting of: said dynamic image viewed by said recipient, said dynamic image has not been viewed by said recipient, the time and the date stamp in which said dynamic image has been viewed by said recipient, said secondary electronic message has been fully viewed, said secondary electronic message has been partially viewed; (d) presenting to said sender the time and the date stamp in which said dynamic image has been viewed by said recipient; (e) utilizing encryption and/or digital signature to said dynamic image and/or said secondary electronic message; (f) activating and deactivating said method for confirming delivery of an electronic message; (g) inserting said at least one link to said dynamic image into the body of said secondary electronic message.

13. The computer readable memory of claim 11, wherein at least one of the following is being held true (a) said secondary electronic message comprises said dynamic image with preserved original links from said original electronic message; (b) said original links are encoded links with a unique tracking key, and said method further comprising steps of updating said server and informing said sender that at least one encoded link has been viewed without viewing said dynamic image; (c) said steps of generating a secondary electronic message and transmitting said secondary electronic message to said recipient computer are performed on said server; (d) said steps of generating a secondary electronic message and transmitting said secondary electronic message to said recipient computer are performed on said sender computer; (e) said step of updating said server that said dynamic image has been viewed by said recipient, wherein said server comprises a database adapted to store the status and of each original electronic message and each secondary electronic message; (f) said step of informing said sender that said dynamic image has been viewed by said recipient is performed by sending a confirmation message to said sender; (g) said step of informing said sender that said dynamic image has been viewed by said recipient is performed by allowing said sender to access said database on said server by means of a web-site; (h) said dynamic image is not viewable to said recipient without performing said step (i) of informing said sender that said dynamic image has been viewed by said recipient; (j) said step of informing said sender that said dynamic image has been viewed by said recipient is performed either prior to, simultaneously or after said step of viewing said dynamic image.

14. The computer readable memory of claim 11, wherein said method is adapted to confirm delivery of an electronic message to multiple recipients when said original electronic message comprises multiple details of recipients, each link to said dynamic image viewed by each recipient of said multiple recipients has a different unique tracking key for confirming delivery of an electronic message independently.

15. The method of claim 11, wherein said original electronic message can be sent to multiple recipients.

16. The method of claim 11, wherein said dynamic message can comprise sensitive areas which comprise links.

17. An electronic messaging system for confirming delivery of an electronic message over a computer network, said system comprising:

a. a sender computer operated by a sender comprising a computer readable memory having computer readable code embodied thereon for programming at least one processor to: (i) compose an original electronic message; (ii) transmit said original electronic message to a server according to a request of said sender;

b. a server comprising a computer readable memory having a computer readable code embodied thereon for programming at least one processor to: (i) convert at least part of the content of said original electronic message to a dynamic image; (ii) save said dynamic image in a specific location on said server; (iii) generate at least one link to said dynamic image with a unique tracking key; (iv) generate a secondary electronic message adapted to be transmitted to said recipient computer; said secondary electronic message comprising said at least one link to said dynamic image and the recipient details; (v) transmit said secondary electronic message to said recipient computer; and, (vi) inform said sender that said dynamic image has been viewed by said recipient, such that the delivery of said original electronic message is confirmed;

c. a recipient computer operated by a recipient comprising a computer readable memory having computer readable code embodied thereon for programming at least one processor to: (i) open said secondary electronic message; (ii) open said at least one link to said dynamic image to view said dynamic image by said recipient, and thereby (iii) update said server that said dynamic image has been viewed by said recipient;

wherein said server is adapted to convert at least part of the content of said original electronic message to a dynamic image via converting means installed on the same, further wherein computer readable code for viewing said dynamic image resides on said server and said link is sent to said recipient, such that only when said recipient actively operates said computer readable code, said dynamic image is viewed by said recipient computer.

18. The electronic messaging system of claim 17, wherein at least one of the following is being held true (a) said dynamic image is not viewable to said recipient without said sender is being informed that said dynamic image has been viewed by said recipient; (b) said sender is being informed that said dynamic image has been viewed by said recipient either prior to, simultaneously or after said dynamic image has been viewed by said recipient; (c) said electronic message is selected from a group consisting of: an e-mail, a short message service (SMS), a text message, a multimedia message service (MMS), an instant messaging (IM), or any combination thereof.

19. The electronic messaging system of claim 17, wherein at least one of the following is being held true (a) said sender computer and said recipient computer is selected from a group consisting of: a personal computer (PC), a mobile phone, a laptop, an electronic device with input and output means, or any combination thereof; (b) said secondary electronic message comprises said dynamic image with preserved original links from said original electronic message; (c) said original links are encoded links with a unique tracking key, and said recipient computer is adapted to update said server and inform said sender that at least one encoded link has been viewed without viewing said dynamic image; (d) said server comprises a database adapted to store the status and of each original electronic message and each secondary electronic message; said status is selected from a group consisting of: said dynamic image viewed by said recipient, said dynamic image has not been viewed by said recipient, the time and the date stamp in which said dynamic image has been viewed by said recipient, said secondary electronic message has been fully viewed, said secondary electronic message has been partially viewed.

20. The electronic messaging system of claim 17, wherein said server is configured to perform at least one selected from a group consisting of (a) inform said sender that said dynamic image has been viewed by said recipient by sending a confirmation message to said sender; (b) inform said sender that said dynamic image has been viewed by said recipient by allowing said sender to access said database on said server by means of a web-site; (c) present to said sender the time and the date stamp in which said dynamic image has been viewed by said recipient; (d) utilize encryption and/or digital signature to said dynamic image and/or said secondary electronic message.

21. The electronic messaging system of claim 17, wherein said system is further adapted to be activated and deactivated by the confirmation of the delivery of an electronic message; further wherein said system is adapted to confirm delivery of an electronic message to multiple recipients when said original electronic message comprises multiple details of recipients, each link to said dynamic image viewed by each recipient of said multiple recipients has a different unique tracking key for confirming delivery of an electronic message independently.

22. The electronic messaging system of claim 17, wherein said at least one link to said dynamic image is insertable into the body of said secondary electronic message.

23. The method of claim 17, wherein said original electronic message can be sent to multiple recipients.

24. The method of claim 17, wherein said dynamic message can comprise sensitive areas which comprise links.

25. An electronic messaging system for confirming delivery of an electronic message over a computer network, said system comprising:
 a. a sender computer operated by a sender comprising a computer readable memory having computer readable code embodied thereon for programming at least one processor configured to: (i) compose an original electronic message; (ii) transmit said original electronic message to a server according to a request of said sender; (iii) generate a secondary electronic message adapted to be transmitted to said recipient computer; said secondary electronic message comprising a link to a dynamic image and recipient details; and, (iv) transmit said secondary electronic message to said recipient computer;
 b. a server comprising a computer readable memory having a computer readable code embodied thereon for programming at least one processor configured to: (i) convert at least part of the content of said original electronic message to a dynamic image; (ii) save said dynamic image in a specific location on said server; (iii) generate at least one link to said dynamic image with a unique tracking key; (iv) transmit said at least one link to said dynamic image to said sender computer; and, (v) inform said sender that said dynamic image has been viewed by said recipient, such that the delivery of said original electronic message is confirmed;
 c. a recipient computer operated by a recipient comprising a computer readable memory having computer readable code embodied thereon for programming at least one processor configured to: (i) open said secondary electronic message; (ii) open said at least one link to said dynamic image to view said dynamic image by said recipient, and thereby (iii) update said server that said dynamic image has been viewed by said recipient;
wherein said server is adapted to convert at least part of the content of said original electronic message to a dynamic image via converting means installed on the same, further wherein computer readable code for viewing said dynamic image resides on said server and said link is sent to said recipient, such that only when said recipient actively operates said computer readable code, said dynamic image is viewed by said recipient computer.

26. The electronic messaging system of claim 25, wherein at least one of the following is being held true (a) said dynamic image is not viewable to said recipient without said sender is being informed that said dynamic image has been viewed by said recipient; (b) said sender is being informed that said dynamic image has been viewed by said recipient either prior to, simultaneously or after said dynamic image has been viewed by said recipient; (c) said electronic message is selected from a group consisting of: an e-mail, a short message service (SMS), a text message, a multimedia message service (MMS), an instant messaging (IM), or any combination thereof; (d) said sender computer and said recipient computer is selected from a group consisting of: a personal computer (PC), a mobile phone, a laptop, an electronic device with input and output means, or any combination thereof; (e) said secondary electronic message comprises said dynamic image with preserved original links from said original electronic message; (f) said original links are encoded links with a unique tracking key, and said recipient computer adapted to update said server and to inform said sender that at least one encoded link has been viewed without viewing said dynamic image; (g) said at least one link to said dynamic image is insertable into the body of said secondary e-mail; and any combination thereof.

27. The electronic messaging system of claim 25, wherein said server comprises a database adapted to store the status and of each original electronic message and each secondary electronic message; wherein said status is selected from a group consisting of: said dynamic image viewed by said recipient, said dynamic image has not been viewed by said recipient, the time and the date stamp in which said dynamic image has been viewed by said recipient, said secondary electronic message has been fully viewed, said secondary electronic message has been partially viewed.

28. The electronic messaging system of claim 25, wherein said server is configured to at least one of the following (a) inform said sender that said dynamic image has been viewed by said recipient by allowing said sender to access said database on said server by means of a web-site; (b) present to said sender the time and the date stamp in which said dynamic image has been viewed by said recipient; (c) utilize encryption and/or digital signature to said dynamic image and/or said secondary electronic message; (d) inform said sender that said dynamic image has been viewed by said recipient by sending a confirmation message to said sender.

29. The electronic messaging system of claim 25, wherein said system is adapted to be activated and deactivated by the confirmation of the delivery of an electronic message; further wherein said system is adapted to confirm delivery of an electronic message to multiple recipients when said original electronic message comprises multiple details of recipients, each link of a dynamic image viewed by each recipient of said multiple recipients has a different unique tracking key for confirming delivery of an electronic message independently.

30. The method of claim 25, wherein said original electronic message can be sent to multiple recipients.

31. The method of claim 25, wherein said dynamic message can comprise sensitive areas which comprise links.

* * * * *